United States Patent
Lahoda et al.

(10) Patent No.: US 8,675,809 B2
(45) Date of Patent: Mar. 18, 2014

(54) NUCLEAR FUEL CLADDING HAVING AN EXTERIOR COMPRISING BURNABLE POISON IN CONTACT WITH AQUEOUS REACTOR COOLANT

(75) Inventors: Edward J. Lahoda, Pittsburgh, PA (US); Warren R. Junker, Monroeville, PA (US); Thomas V. Congedo, Pittsburgh, PA (US); John P. Lareau, Granby, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 174 days.

(21) Appl. No.: 12/858,496

(22) Filed: Aug. 18, 2010

(65) Prior Publication Data
US 2011/0002434 A1 Jan. 6, 2011

Related U.S. Application Data

(62) Division of application No. 11/692,952, filed on Mar. 29, 2007, now Pat. No. 7,815,964.

(51) Int. Cl.
*G21C 3/00* (2006.01)

(52) U.S. Cl.
USPC .............. 376/419; 376/409; 376/412

(58) Field of Classification Search
USPC ......................................... 376/419
See application file for complete search history.

(56) References Cited

U.S. PATENT DOCUMENTS

| 3,427,222 A | * | 2/1969 | Biancheria et al. | 376/419 |
| 3,520,958 A | | 7/1970 | Geert Versteeg et al. | |
| 4,774,051 A | | 9/1988 | Peehs et al. | |
| 5,075,075 A | * | 12/1991 | Kapil | 376/419 |
| 5,319,690 A | * | 6/1994 | Glazman et al. | 376/419 |
| 5,337,337 A | | 8/1994 | Aoyama et al. | |
| 2006/0109946 A1 | | 5/2006 | Lahoda et al. | |

OTHER PUBLICATIONS

CRC Handbook of Chemistry and Physics, 92nd Edition, Eds.: Haynes and Lide, 2011-2012, p. 4-97 (Internet Version).*

* cited by examiner

*Primary Examiner* — Jack W Keith
*Assistant Examiner* — Marshall O'Connor
(74) *Attorney, Agent, or Firm* — Joseph C. Spadacene; Westinghouse Electric Company LLC

(57) ABSTRACT

An article made by applying a burnable poison onto the cladding of a nuclear fuel rod, which involves providing a nuclear fuel rod and at least one application device, rotating the nuclear fuel rod, optionally removing one or more oxides and/or surface deposits on the outer surface of the nuclear fuel rod by spraying an abrasive material onto the nuclear fuel rod via the application device while adjusting the position of the application device in relation to the nuclear fuel rod, and applying burnable poison particles onto the outer surface of the nuclear fuel rod by spraying the burnable poison onto the nuclear fuel rod via the application device while adjusting the position of the application device in relation to the nuclear fuel rod, where the burnable poison particles are applied at a velocity sufficient to cause adhesion to the outer surface of the cladding.

4 Claims, 2 Drawing Sheets

NUCLEAR FUEL CLADDING HAVING AN EXTERIOR COMPRISING BURNABLE POISON IN CONTACT WITH AQUEOUS REACTOR COOLANT

CROSS-REFERENCE TO RELATED APPLICATIONS

The present application is a divisional of and claims the benefit of U.S. patent application Ser. No. 11/692,952, filed Mar. 29, 2007, entitled METHOD OF APPLYING A BURNABLE POISON ONTO THE EXTERIOR OF NUCLEAR FUEL ROD CLADDING, the disclosure of which is incorporated herein by reference.

BACKGROUND OF THE INVENTION

1. Field of the Invention

This invention relates generally to nuclear fuel rods. More specifically, this invention relates to a method of applying a burnable poison onto the exterior of a nuclear fuel rod, which burnable poison will adhere and be effective even after contact with coolant water.

2. Description of the Related Art

Burnable poisons, which are materials that have a high neutron absorption cross-section that gradually burn-up under neutron irradiation, are typically utilized in nuclear reactors to control excess reactivity in the nuclear fuel without having to employ one or more control rods. Burnable poisons are currently incorporated into the fuel of a nuclear reactor. Moreover, due to the burn-up of the burnable poison, the negative reactivity of the burnable poison decreases over core life. Examples of patents in this area include U.S. Pat. Nos. 3,520,958; 4,774,051; 5,075,075, and 5,337,337 (Versteeg et al.; Peeks et al.; Kopel and Aoyama et al.; respectively) and U.S. Patent Publication No. U.S. 2006/0109946 A1 (Lahoda et al.).

SUMMARY OF THE INVENTION

Various needs are met by various embodiments of this invention which provide an application device positioned adjacent to a surface of a nuclear fuel rod. The application device is used to spray the nuclear fuel rod with a variety of materials such as, for example, an abrasive material, a burnable poison, and/or a finishing coat.

In accordance with one embodiment of the invention, a method for applying a burnable poison to a nuclear fuel rod that comprises providing a nuclear fuel rod having an axis and an outer surface having or not having a number of oxides and surface deposits, as well as providing at least one application device adjacent the surface of the nuclear fuel rod.

The method also comprises rotating the nuclear fuel rod about its axis, or moving the at least one application device and holding the rod still, and removing a portion of any oxides and surface deposits on the outer surface of the nuclear fuel rod by spraying an abrasive material onto the nuclear fuel rod via the at least one application device while adjusting the position of the application device in relation to the nuclear fuel rod, or optionally not removing oxides or other surface deposits.

The method also comprises applying a burnable poison onto the surface of the nuclear fuel rod by spraying the burnable poison onto the nuclear fuel rod via the application device while the position of the at least one application device is adjusted in relation to the nuclear fuel rod.

In accordance with another embodiment of the invention, a method for applying a burnable poison to a nuclear fuel rod that comprises providing a nuclear fuel rod that has an axis and an outer surface which has a number of oxides and surface deposits. The method also comprises providing an application device adjacent the surface of the nuclear fuel rod. The application device includes a channel that extends therethrough. The channel is in communication with a pressurized gas source as well as a particle source. The method further comprises providing an image capture device adjacent the nuclear fuel rod. The image capture device is adapted to transmit an image to a remote viewing station.

The method also comprises rotating the nuclear fuel rod about its axis and removing a portion of the oxides and surface deposits on the outer surface of the nuclear fuel rod by spraying the nuclear fuel rod with an abrasive material via the application device as the position of the application device is adjusted in relation to the nuclear fuel rod. Specifically, an abrasive particle is introduced into the channel of the application device via the particle source and pressurized gas is expelled from the pressurized gas source through the channel of the application device thereby spraying the abrasive particle onto the surface of the nuclear fuel rod.

The method further comprises applying a burnable poison onto the surface of the nuclear fuel rod by spraying the burnable poison onto the nuclear fuel rod via the application device as the position of the application device is adjusted in relation to the nuclear fuel rod. Specifically, a burnable poison particle is introduced into the channel of the application device via the particle source and pressurized gas is expelled from the pressurized gas source through the channel of the application device thereby spraying the burnable poison onto the surface of the nuclear fuel rod.

In accordance with yet another embodiment of the invention, a method for applying a burnable poison to a nuclear fuel rod that comprises (a) providing a nuclear fuel rod having an axis and an outer surface which has a number of oxides and surface deposits as well as (b) providing an application device adjacent the surface of the nuclear fuel rod.

The method also comprises (c) rotating the nuclear fuel rod about its axis and (d) stopping the rotation of the nuclear fuel rod about its axis. The method further comprises (e) removing a portion of the oxides and surface deposits on the outer surface of the nuclear fuel rod by spraying an abrasive material onto the nuclear fuel rod via the application device while adjusting the position of the application device is adjusted in relation to the nuclear fuel rod as well as (f) applying a burnable poison onto the surface of the nuclear fuel rod by spraying the burnable poison onto the nuclear fuel rod via the application device while adjusting the position of the application device is adjusted in relation to the nuclear fuel rod.

The pressure of the gas, the particle size and the distance from the rod cladding is adjusted to be effective so that the particles impact at a velocity high enough to cause surface activity, such as, in the case of a metal cladding, to melt a surface layer of the metal of the fuel rod cladding. Subsequent water contact with the impacted, layered particles will form a protective oxide coating on the outside of the exterior particle layer, such that it keeps the other interior burnable poison layers from dissolving in the reactor coolant. This is an unexpected result, since the burnable poisons are generally soluble with aqueous reactor coolant.

A major advantage of having the burnable poison outside the fuel rod cladding is that, for example, if boron is used as part of the burnable poison, resulting helium gas generated during nuclear reaction will not over pressurize the inside of the fuel rod.

BRIEF DESCRIPTION OF THE DRAWINGS

A full understanding of the disclosed and claimed concept can be gained from the following Description when read in conjunction with the accompanying drawings in which:

DESCRIPTION OF THE PREFERRED EMBODIMENTS

Figure 1:
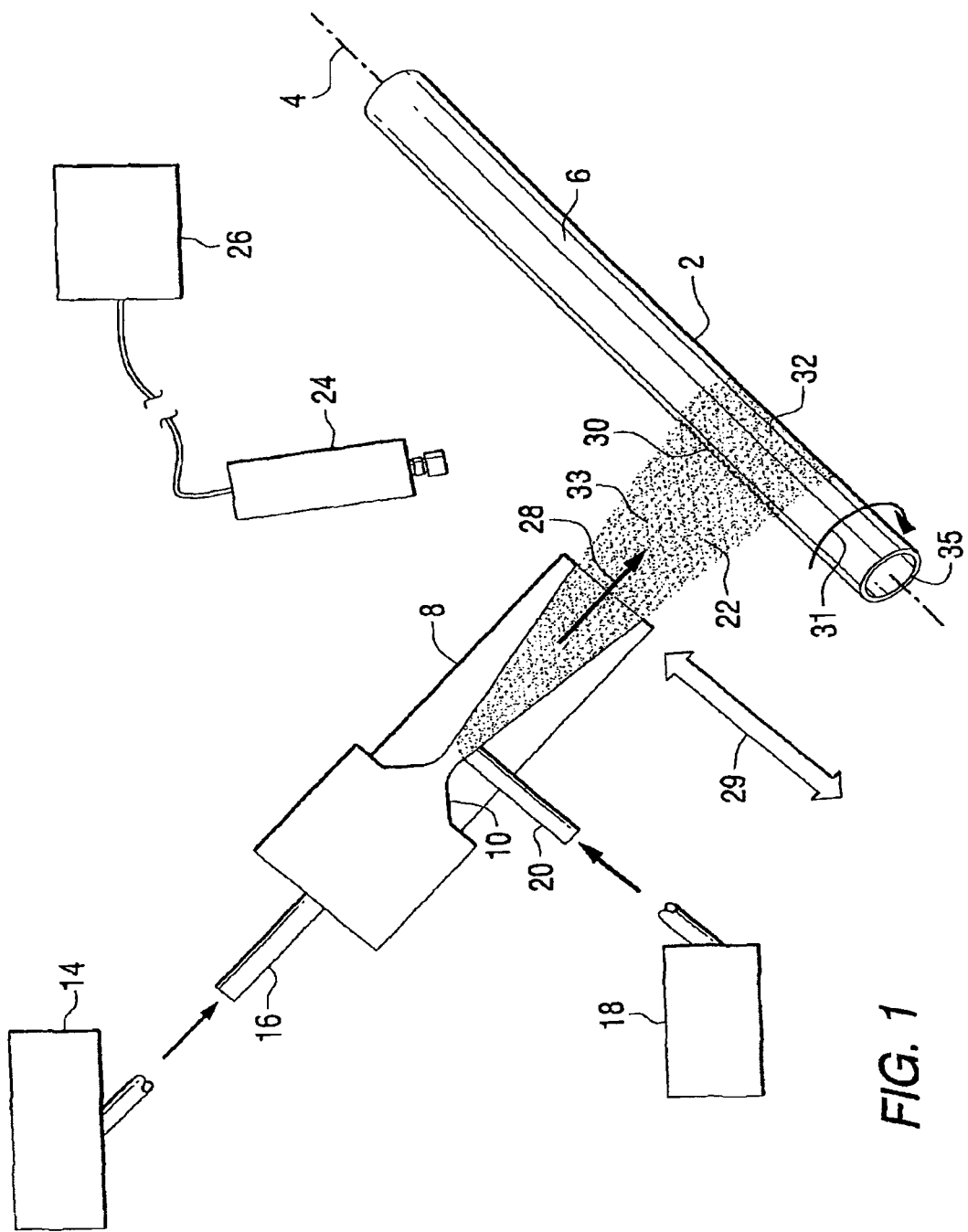
FIG. 1, which best illustrates the invention, is a schematic illustration depicting one embodiment of an application device and an image capture device positioned adjacent a nuclear fuel rod. This is for the case where the rod is rotated and the application device is held steady. As stated previously, the application device can be rotated around a stationary rod.

As employed herein, the term "number" means one or an integer greater than one (i.e., a plurality).

As employed herein, the term "burnable poison" refers broadly to a material that captures neutrons without giving out neutrons but has the capacity for absorbing neutrons reduced over time (burnable)—as it absorbs neutrons, for example, elemental boron or boron containing compounds such as $ZrB_2$ or $HfB_2$; rare earths such as elemental Hf, Gd or Er; and rare earth oxides, preferably $Gd_2O_3$ and $Er_2O_3$, and their mixtures. The most preferred material is $ZrB_2$.

When referring to any numerical range of values, such ranges are understood to include each and every number and/or fraction between the stated range minimum and maximum.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

Referring to FIG. 1, a nuclear fuel rod 2, containing fuel pellets or particles (not shown), having an axis 4 and an outer surface 6, such as metal cladding (for example zirconium based metal) or ceramic cladding (for example SiC) is provided. At least one application device 8 is positioned adjacent the outer cladding surface 6 of the nuclear fuel rod 2. The nuclear fuel rod 2 is connected to an apparatus (not shown) that is adapted to rotate the nuclear fuel rod 2 about its axis 4. In one embodiment, the rotation of the nuclear fuel rod 2 about its axis 4 is continuous. In another embodiment, however, the rotation of the nuclear fuel rod 2 is incremental (i.e., the nuclear fuel rod 2 is rotated then the rotation of the nuclear fuel rod 2 is stopped). If the nuclear rod 2 is continuously rotated about its axis 4, then in one embodiment, the rate of rotation is adjusted such that the a deposit of burnable poison particles of the required thickness is obtained. This thickness can involve 2 or more layers and the total thickness can range from 0.001 mil to 10 mils (1 mil=0.001 inch). Under 0.001 mil. (0.025 micrometers). There is too little neutron absorption and over 10 mils (254 micrometers) there is too much neutron absorption by the burnable poison, so that it becomes difficult to start the reactor.

The application device 8 includes a channel 10 that extends therethrough. The channel 10 is in communication with a pressurized gas source 14 via a gas inlet tube 16 and a particle source 18 via a particle inlet tube 20. Pressurized gas that is expelled from the gas source 14 travels through the gas inlet tube 16 and the channel 10 of the application device 8 thereby propelling particles 22, which are injected into the channel 10 via the particle inlet tube 20. The particles 22 from the application device 8 spray the nuclear fuel rod 2 with the particles 22. As will be discussed in greater detail below, the particles 22 that are sprayed onto the nuclear fuel rod 2 can include, for example, initially and optionally, abrasive particles, and then burnable poison particles having a particle size of from 1 micrometer to 250 micrometers, and finally, optionally, already protective particles that can be used to coat the burnable poison. These latter outer already protective coating particles include Zr metal particles. Any particles applied are non-electrostatic, that is they are not charged electrically and caused to adhere merely by electrostatic means, as that would not provide sufficient intimate, very adherent layers.

Figure 2:
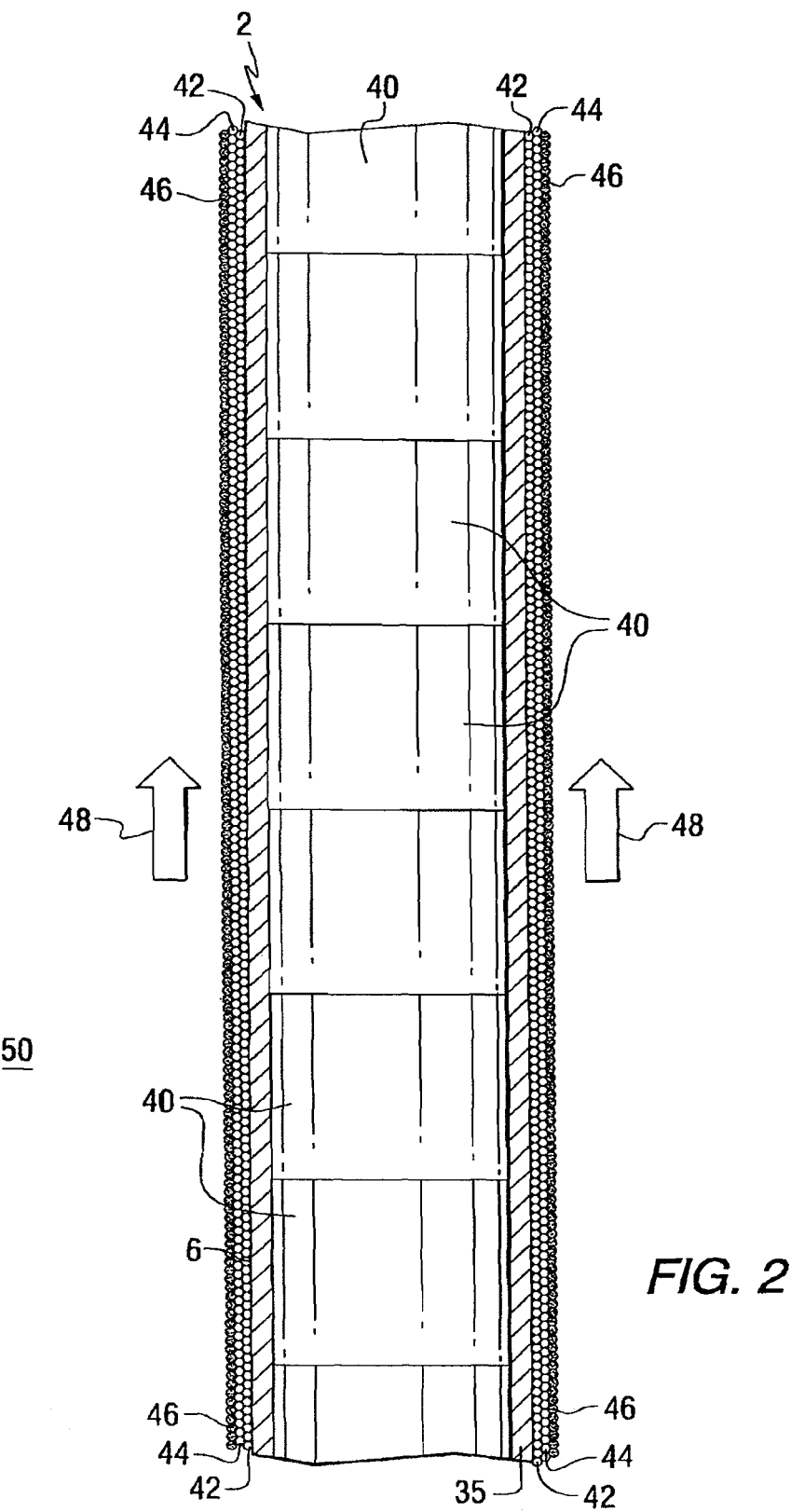
FIG. 2 is a schematic illustration depicting aqueous coolant contact with the outer particle layer of the coated rod cladding in a nuclear environment.

A very important feature of the invention is spraying the cladding with burnable poison particles 33 at such a velocity, for example 1,500 ft./second to 2,500 ft./second (457 meters/second to 762 meters/second), to initiate a surface phase change, generally shown as 30, at the exterior of the cladding, especially for metal cladding, so that some molecular surface melting occurs and the impacting particles adhere, forming a base particle layer, 42 in FIG. 2, that improves further layer adhesion. The larger the particle size the less velocity needed.

By "molecular surface melting" is meant anything from interatom bonding between metal cladding and the burnable poison particles, to forming melt craters.

The top burnable poison layer, 46 in FIG. 2, of, for example $ZrB_2$ burnable poison particles is subject, during operation in a nuclear environment 50 on FIG. 2, such as a nuclear reactor, illustrated in FIG. 2, and described further on in the application, to oxidation by the passing cooling water thus forming a protective $ZrO_2$ product that inhibits further reaction of the $ZrB_2$ layers beneath 42 and 44 in FIG. 2, by the reaction.

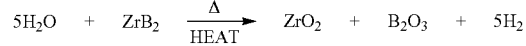

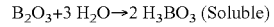

It had been assumed that all $ZrO_2$ would be removed/dissolved and carried away by the reactor coolant. Optionally, additional inherently already protective material such as Zr metal can be applied to the outer surface.

The application device 8 is mounted onto a translocation apparatus (not shown), such as a robotic arm, which is adapted to adjust the position of the application device 8 in relation to the nuclear fuel rod 2. For example, the robotic arm can translocate (move) the application device 8 along the length of the nuclear fuel rod 2. Additionally, the translocation apparatus can also adjust the angle application device 8 in relation to the nuclear fuel rod 2. For instance, the robotic arm can position the application device 8 such that the application device 8 is positioned co-axial to the nuclear fuel rod 2.

An image capture device 24 may also be positioned adjacent the nuclear fuel rod 2. The image capture device 24 is adapted to transmit an image to a remote viewing station 26 so that the process of coating the nuclear fuel rod 2 may be monitored. In one embodiment the image capture device 24 is also connected to the robotic arm to which the application device 8 is mounted. In another embodiment, however, the image capture device 24 is mounted to another translocation apparatus (not shown) so that the image capture device 24 may be translocated independent of the application device 8.

In one embodiment of the process, the nuclear fuel rod 2 is rotated continuously about its axis 4. As the nuclear fuel rod 2 is rotated, the application device 8 is positioned adjacent to the outer surface 6 of the nuclear fuel rod 2. Once the application device is in the proper position, an abrasive material, such as particles of aluminum oxide or boron nitride, is sprayed onto the outer surface 6 of the nuclear fuel rod 2 via the application device 8 in order to remove one or more oxides and/or surface deposits that are disposed on the outer surface 6 of the nuclear fuel rod 2. The process of removing the oxides and/or surface deposits from the nuclear fuel rod 2 is typically done in order to provide a substantially clean surface onto which a burnable poison can be applied onto the nuclear fuel rod 2 in one or more subsequent steps. As the abrasive material is expelled from the application device 2, the position and/or angle of the application device 8 is adjusted in relation to the rotating nuclear fuel rod 2. Note that this step may not be necessary as the oxides or other surface contaminants may have been removed previously or may be low enough to provide acceptable adhesion of the burnable poison to the exterior surface of the rod.

After a portion of the oxides and/or surface deposits are optionally removed from the nuclear fuel rod 2, the application device 8 is used to apply a burnable poison onto the nuclear fuel rod 2 as the nuclear fuel rod 2 continues to rotate. Specifically, elemental particles of a burnable poison such as, without limitation, elemental boron, elemental gadolinium, elemental hafnium or elemental erbium, $Er_2O_3$, $Gd_2O_3$, $HfB_2$, or $ZrB_2$ is expelled from the application device 8 and sprayed onto the nuclear fuel rod 2. These particles are shown specifically as particles 33. The burnable poison particles 33 would always be applied after (not with) application of optional particles 22 such as abrasive cleaning particles (shown in the same FIG. 1 but particles 22 and 33 are sprayed at separate times and never together). As the burnable poison particles are sprayed onto the nuclear fuel rod 2, the position and/or angle of the application device 8 is adjusted in relation to the nuclear fuel rod 2 such that a layer of burnable poison begins to accumulate on the outer surface 6 of the nuclear fuel rod 2.

The velocity at which the burnable poison is expelled from the application device 8 is dependent upon that rate at which the pressurized gas is expelled from the pressured gas source 14 as well as the mass of the particles that are introduced into the channel 10 of the application device 8. In one embodiment, a plurality of substantially uniform layers of burnable poison is deposited onto the nuclear fuel rod 2 which total thickness layers can range from about 0.001 mil to 10 mils (coating thickness). In another embodiment, the layers are substantially non-uniform. That is, for example an initial layer, to example 42, may have particle size of 300 micrometers to cause good adhesive impact, followed by 2 to 10 layers of 50 micrometer particles. After application, the rod can be discharged immediately from the application device.

After the process of applying the burnable poison onto the nuclear fuel rod 2 is complete, an inherently already protective finishing coat may optionally be applied onto the deposited burnable poison layers. The finishing coat may be a metal such as, without limitation, zirconium, hafnium, titanium or similar material that provides a protective barrier coating for the burnable poison that is already sprayed and deposited. As with previous steps, the position and/or angle of the application device 8 is typically adjusted in relation to the nuclear fuel rod 2 during the process of depositing the finishing coat onto the burnable poison.

In other embodiments, a nuclear fuel rod 2 having a finishing coat may optionally be subjected to various downstream processes, such as mechanical processing, in order to impart a desired surface finish on the coated nuclear fuel rod 2.

In another embodiment of the invention, the nuclear fuel rod 2 is not continuously rotated about its axis 4. Rather, the nuclear fuel rod 2 is incrementally rotated about its axis 4. In this particular embodiment, the nuclear fuel rod 2 is rotated incrementally so that the burnable poison may be deposited onto the outer surface 6 of the nuclear fuel rod 2 in a strip-like manner. Accordingly, one would appreciate that in this particular embodiment the nuclear fuel rod 2 will have a number of strips of burnable poison that extend along the length of the nuclear fuel rod 2 substantially parallel to the axis 4 of the nuclear fuel rod 2. In another embodiment, the rod 2 can be stationary and one or more application devices 8 can be rotated transversely about the rod axis.

Also shown in FIG. 1 is arrow 28 representing the velocity of the powder particles, especially the burnable poison particles 33; the arrow 29 showing one direction of the sprayer motion; and arrow 31 showing one embodiment of the rod rotation. The initial layer of burnable poison particles 33 impinge on the metal or ceramic surface 6 of cladding 35, which is shown as a tube, with a velocity effective to cause a surface "action" 30, such as a slight molecular surface melting, inner atom diffusion between the burnable poison and metal or ceramic cladding, or atom bonding due to crystal formation; which causes adherence of the particles 33, to provide one or more particle layers 32 in FIG. 1. These burnable particle layers can each be all the same size (diameter) particles or a mixture of particle sizes.

Referring now to FIG. 2, a fuel rod 2, in a nuclear environment 50, having cladding 35 and a cladding outer surface 6 is shown in section. The cladding, shown here, contains interior fuel pellets 40, which may be inserted within the fuel rod before or after spraying. A first applied burnable particle layer is shown as 42, second and third applied burnable particle layers are shown as 44 and 46 respectively. Cooling water 48 is shown passing near outer/contacting burnable layer outer 46, which aqueous coolant material will react, in a heated/hot environment, usually about 200° C. to about 360° C. with the burnable particles to form a protective oxide on or in layer 46 (shown hatched) which will protect the interior burnable layers 42 and 44.

While specific embodiments of the invention have been described in detail above, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof. For instance, as mentioned above, moving the application device and not the rod.

What is claimed is:

1. A nuclear fuel rod with metal cladding having exterior burnable poison particles thereon in exterior contact with aqueous reactor coolant, the fuel rod having an axis, and an outer abraded surface on said metal cladding; an initial layer of burnable poison particles, having a particle size of from 1 micrometer to 250 micrometers, on said outer abraded, metal cladding surface of said nuclear fuel rod where the initial layer of the burnable poison particles are adhered to said outer surface of said metal cladding at a phase change interface caused by impact of the particles where said phase change interface is selected from the group consisting of molecular surface melting of the metal cladding, atom bonding due to crystal formation and inner atom diffusion between the burnable poison and cladding; additional layers of adhering burnable poison particles on said initial layer, where the exterior layer of the additional layers has a protective oxidation caused by contact with the aqueous coolant, wherein the burnable poison particles are selected from the group consisting of elemental boron, elemental gadolinium, elemental hafnium, elemental erbium, $HfB_2$, $ZrB_2$, $Gd_2O_3$, and mixtures thereof; the metal cladding is a zirconium based metal; and wherein fuel pellets are contained inside the metal cladding.

2. The nuclear fuel rod of claim 1, wherein the additional layers of burnable poison particles have a total thickness of from 0.001 mils to 10 mils.

3. The nuclear fuel rod of claim 1, wherein the burnable poison is $ZrB_2$, and the phase change interface is on the exterior surface of the rod.

4. The nuclear fuel rod of claim 1, wherein the protective oxidation when initially formed, continuously protects the interior burnable poison particles from dissolving in the contacting reactor coolant, which coolant has a temperature of from about 200° C. to 360° C., and wherein said burnable poison particles are not dissolved.

* * * * *